(No Model.)
C. P. STEINMETZ.
METHOD OF AND APPARATUS FOR PREVENTING PHASE DISPLACEMENT
IN ALTERNATING CIRCUITS.
No. 513,370. Patented Jan. 23, 1894.
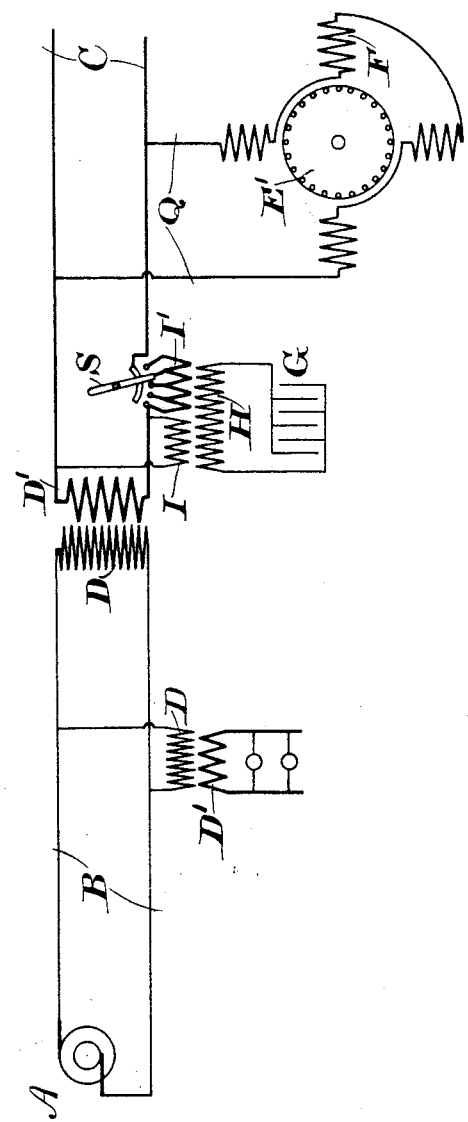
WITNESSES.
A. F. Macdonald.
John W. Gibboney.
INVENTOR.
Charles P. Steinmetz
By Bentley & Blodgett
Attys.

UNITED STATES PATENT OFFICE.

CHARLES P. STEINMETZ, OF LYNN, ASSIGNOR TO THE GENERAL ELECTRIC COMPANY, OF BOSTON, MASSACHUSETTS.

METHOD OF AND APPARATUS FOR PREVENTING PHASE-DISPLACEMENT IN ALTERNATING CIRCUITS.

SPECIFICATION forming part of Letters Patent No. 513,370, dated January 23, 1894.

Application filed September 9, 1893. Serial No. 485,185. (No model.)

*To all whom it may concern:*

Be it known that I, CHARLES P. STEINMETZ, of Breslau, in the Kingdom of Prussia and Empire of Germany, residing at Lynn, in the county of Essex and State of Massachusetts, have invented certain new and useful Improvements in Methods of and Apparatus for Preventing Displacement of Phase in Alternating Circuits, of which the following is a specification.

The present invention relates to an improved method and apparatus by which the lag or displaced phase relation of the current in an alternating circuit is overcome by the use of condensers or equivalent neutralizers of self induction, and it provides for the ready regulation of the action of such condensers in accordance with changes in the nature and amount of the load in circuit.

Heretofore it has been proposed to place a condenser in a local circuit around various translating devices in order to overcome the lag of the current due to the self induction of the translating devices. When so arranged there is generated in the condenser a current in advance of the main current which when added to the main current tends to overcome the lag in the particular translating device shunted. Similarly, condensers have been placed in series with translating devices which take a lagging current so that the retarded electro-motive force waves then generated in the condenser maintains or tends to maintain, the current in phase. In this instance, however, the capacity of the condenser has been selected with reference to the special translating devices in connection with which it is used. While it is possible to compensate in a rough way, in the manner described, for the lag of the current in individual translating devices without change either in the size of the condenser or in the influences which determine the compensating action of the condenser, it is impracticable to compensate for the lag of the current in a circuit where displacement of phase varies within considerable limits with changes in amount and the nature of the load, unless there are some means for maintaining the compensating action of the condenser roughly proportional to the displacement in phase of the current.

This needed flexibility in the action of the condenser is what the present invention aims to secure so that, for example, the lag of the current in a circuit may be practically nullified no matter what changes of load take place; while, at the same time, by a sort of compounding action thereby the potential under full load may be increased. This is accomplished as described herein by connecting the condenser with the circuit through shunt and series coils in inductive relation to the secondary conductor connected directly with the condenser. In other words the condenser is placed in a separately transformed circuit, and the action of the transformer is made dependent both upon the voltage and the current in the main circuit. When so arranged the inductive action of the shunt coil generates accelerated current waves in advance of the main current waves and proportional in amount to the potential in the main circuit, while the influence of the condenser is made to correspond with the current strength at different times by the series coil which gives rise to retarded electro-motive force waves which together with the accelerated current waves serve to overcome the lag. To still further control the action of the condenser the inductive action of the series coil for a given current strength is made regulable.

In the accompanying drawing which illustrates the invention there is shown diagrammatically an alternating current generator A connected to the primary or high potential main B. The high potential current is transformed to the low potential suitable for the translating devices in the secondary circuit C by transformers having their primary conductors D connected in parallel across the high potential main in the ordinary manner and their secondary conductors D' in inductive relation to the primaries. Connected to the secondary circuit is an induction motor E' whose inducing coils F are connected in series in shunt Q across the secondary mains. Such a translating device possesses considerable self induction and unless it is neutralized the current will lag behind the electro motive force waves, making the motor very inefficient and giving rise to numerous other evils which are well understood. To overcome these evils, a condenser G is provided which is in circuit with the secondary conductor H of a transformer whose primary conductors include a coil I in shunt across the mains C and a second coil I' in series with one of the mains. The inductive action of the transformer depends therefore both upon the voltage and current strength in the secondary circuit C, and as the result of both these influences the corrective waves generated in the condenser will tend to accelerate the current in the main circuit relatively to the electro-motive force so as to overcome the lag. The number of turns of the shunt coil I and the series coil I' will be so proportioned that the increase of current going through the series coil corresponding to the increased demand by the translating devices shall automatically so influence the action of the condenser as to compensate for the corresponding increased tendency of the main current to lag. If desired however the windings may be proportioned so as to give what may be likened to an overcompounding action in a non-inductive circuit; that is, so that the accelerating influences of the condenser on the current shall more than compensate for an increased lag of the current when its strength is increased, whereby the effective potential is raised. The action of the condenser is therefore regulable to a certain extent but in actual practice still further regulation of the action of the series coil will be needed. This may be accomplished in a number of ways, as, for example, by a re-active coil though a preferable method is to vary the effective length of the coil. For this purpose the series coil is shown wound in sections and a switch S is provided for short-circuiting more or less of the coil as may be desired.

The invention is not necessarily confined to the use of condensers alone as there are other means of compensating for the lag of the current which are now known and which may be used, as, for example, polarizing cells and certain electro-dynamic phase controllers for which I have recently made application for Letters Patent. The ratio of transformation will be made such by properly proportioning the condensers of the transformer in the condenser circuit as will give a potential not too high for safety but greater than that in the secondary circuit and avoid making the condenser unnecessarily large. The lag of the current in a poly-phase circuit may be overcome in the same way as in the single phase system illustrated in the drawing.

What I claim as new, and desire to secure by Letters Patent, is—

1. The method of overcoming the lag or displaced phase relation of the current in an alternating current inductive circuit, which consists in adding to the main waves of current and electro-motive force accelerated current waves and retarded electro-motive force waves in correspondence respectively with the potential and current strength in said circuit.

2. The method of overcoming the lag or displaced phase relation of the current in an alternating current inductive circuit, which consists in generating or adding to the main current and electro-motive force accelerating current waves and retarded electro-motive force waves, and regulating the influence of one of said series of waves in correspondence with changes in the nature and amount of load in the circuit, as set forth.

3. The method of overcoming the lag or displaced phase relation of the current in an alternating current circuit, which consists in generating accelerated current waves and retarded electro-motive force waves by inductive influences, respectively proportional to the potential and current strength in the circuit, and adding such corrective waves to the main waves, as set forth.

4. The method of regulating the action of a condenser, or like self induction neutralizer, upon the phase relation between the current and electro-motive force in an alternating current circuit, which consists in varying the inductive action of a series conductor in inductive relation to said condenser in accordance with changes in the nature and amount of load in the circuit, as set forth.

5. The combination in an alternating current circuit of a condenser, or like self induction neutralizer, connected inductively to said circuit through conductors carrying currents respectively proportional to the potential and current strength in the main circuit, as set forth.

6. The combination in an alternating current circuit of a condenser, or like self-induction neutralizer, with a transformer connecting the condenser inductively with the circuit and comprising shunt and series primary conductors as described, and means for regulating the inductive action of the series conductor, as set forth.

7. The combination of an alternating current circuit and a condenser, or equivalent self-induction neutralizer, in circuit with the secondary conductor of a transformer whose primary comprises both series and shunt conductors, and a switch for varying the effective length of said series conductor, as set forth.

8. The combination of a condenser, or like self-induction neutralizer, for overcoming the lag in an alternating current circuit, and coils in shunt and series relation, respectively, to the main circuit by whose combined influence the action of the said induction neutralizer is controlled, as set forth.

In witness whereof I have hereunto set my hand this 7th day of September, 1893.

CHARLES P. STEINMETZ.

Witnesses:
JOHN W. GIBBONEY,
BENJAMIN B. HULL.